US010773438B2

(12) United States Patent
Panjwani

(10) Patent No.: US 10,773,438 B2
(45) Date of Patent: Sep. 15, 2020

(54) MOLDING SYSTEM

(71) Applicant: HUSKY INJECTION MOLDING SYSTEMS LTD., Bolton (CA)

(72) Inventor: Vijay Gopichand Panjwani, Brampton (CA)

(73) Assignee: HUSKY INJECTION MOLDING SYSTEMS LTD., Bolton, Ontario (CA)

( * ) Notice: Subject to any disclaimer, the term of this patent is extended or adjusted under 35 U.S.C. 154(b) by 218 days.

(21) Appl. No.: 14/655,123

(22) PCT Filed: Nov. 6, 2013

(86) PCT No.: PCT/CA2013/050844
§ 371 (c)(1),
(2) Date: Jun. 24, 2015

(87) PCT Pub. No.: WO2014/106297
PCT Pub. Date: Jul. 10, 2014

(65) Prior Publication Data
US 2015/0321404 A1    Nov. 12, 2015

Related U.S. Application Data

(60) Provisional application No. 61/749,539, filed on Jan. 7, 2013.

(51) Int. Cl.
*B29C 45/42* (2006.01)
*B29C 45/76* (2006.01)
(Continued)

(52) U.S. Cl.
CPC .......... *B29C 45/4225* (2013.01); *B29C 45/76* (2013.01); *B29C 45/78* (2013.01);
(Continued)

(58) Field of Classification Search
CPC . B29C 45/76; B29C 45/78; B29C 2945/7604; B29C 2945/76464; B22D 17/32; G05B 2219/45244
(Continued)

(56) References Cited

U.S. PATENT DOCUMENTS 3,509,937 A * 5/1970 Radd .................. B22D 11/0631
164/413
4,522,581 A    6/1985 Schad et al.
(Continued)

FOREIGN PATENT DOCUMENTS

CA    2347279 A    1/2002
CN    1336280 A    2/2002
(Continued)

OTHER PUBLICATIONS

English translation of Fink et al. (DE 342551 A1) (Year: 1986).*
(Continued)

*Primary Examiner* — James J Lee
*Assistant Examiner* — Shon G Foley

(57) ABSTRACT

Disclosed herein, amongst other things, is a molding system (100) comprising control structure that includes a mold (120) that is configured to mold a molded article (180), a controller (170) with which to control the operation of the molding structure, and a vision system (174) with which to appreciate a parameter of the molded article (180) for control of molding system (100).

14 Claims, 2 Drawing Sheets

(51) Int. Cl.
    *B29C 45/78*  (2006.01)
    *G05B 19/18*  (2006.01)
    *B29L 31/00*  (2006.01)

(52) U.S. Cl.
    CPC ...... *G05B 19/182* (2013.01); *B29C 2945/761* (2013.01); *B29C 2945/7604* (2013.01); *B29C 2945/7629* (2013.01); *B29C 2945/76153* (2013.01); *B29C 2945/76167* (2013.01); *B29C 2945/76321* (2013.01); *B29C 2945/76418* (2013.01); *B29C 2945/76421* (2013.01); *B29C 2945/76424* (2013.01); *B29C 2945/76464* (2013.01); *B29C 2945/76595* (2013.01); *B29C 2945/76792* (2013.01); *B29C 2945/76799* (2013.01); *B29C 2945/76899* (2013.01); *B29C 2945/76903* (2013.01); *B29L 2031/772* (2013.01); *G05B 2219/45244* (2013.01)

(58) Field of Classification Search
    USPC .......................................................... 700/112
    See application file for complete search history.

(56) References Cited

U.S. PATENT DOCUMENTS

| | | | |
|---|---|---|---|
| 4,841,364 A | 6/1989 | Kosaka et al. | |
| 5,384,079 A * | 1/1995 | Bur | B29C 45/76 250/459.1 |
| 5,411,074 A * | 5/1995 | Naruse | B22D 17/2218 164/151.4 |
| 5,928,578 A | 7/1999 | Kachnic et al. | |
| 6,475,415 B1 | 11/2002 | Neter et al. | |
| 6,592,355 B2 * | 7/2003 | Kachnic | B29C 45/7626 425/136 |
| 6,878,316 B1 | 4/2005 | Cochran et al. | |
| 7,072,735 B2 | 7/2006 | Smith | |
| 7,168,942 B1 * | 1/2007 | Wieder | B29C 45/7306 249/79 |
| 7,204,943 B2 | 4/2007 | Cochran et al. | |
| 2006/0202370 A1 | 9/2006 | Bader | |
| 2009/0099679 A1 * | 4/2009 | Sandoval | B29C 45/768 700/110 |
| 2009/0200698 A1 | 8/2009 | Niewels et al. | |
| 2010/0255138 A1 | 10/2010 | Deckers et al. | |
| 2012/0119413 A1 | 5/2012 | Niewels | |
| 2012/0306113 A1 * | 12/2012 | Kershaw | B29C 45/542 264/40.7 |
| 2014/0234608 A1 * | 8/2014 | Kohlert | B29B 7/88 428/220 |

FOREIGN PATENT DOCUMENTS

| | | | | |
|---|---|---|---|---|
| DE | 3424551 A1 * | 1/1986 | | G01J 5/0806 |
| DE | 102010042759 | 4/2012 | | |
| GB | 1380447 A | 1/1975 | | |
| JP | H07290542 A | 11/1995 | | |
| WO | 9605040 A1 | 2/1996 | | |
| WO | 0189790 A1 | 11/2001 | | |
| WO | 2011137264 A1 | 11/2011 | | |

OTHER PUBLICATIONS

PCT International Search Report; Cuerrier, Pierre; dated Nov. 28, 2013; 4 pages.
European Search Report, Moeller Bichler, M; dated Mar. 20, 2017, 7 pages.

* cited by examiner

MOLDING SYSTEM

TECHNICAL FIELD

Non-Limiting embodiments disclosed herein generally relate to a molding system and a related method for the operation thereof.

SUMMARY

In accordance with an aspect disclosed herein, there is provided a control structure for a molding system comprising: a vision system with which to appreciate a parameter of a molded article and control operation of the molding system.

In accordance with another aspect disclosed herein, there is provided a method of controlling a molding system comprising appreciating a parameter of a molded article using a vision system and controlling operation of the molding system with reference to the parameter of the molded article.

These and other aspects and features of non-limiting embodiments will now become apparent to those skilled in the art upon review of the following description of specific non-limiting embodiments in conjunction with the accompanying drawings.

DETAILED DESCRIPTION OF THE DRAWINGS

The non-limiting embodiments will be more fully appreciated by reference to the accompanying drawings, in which.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE NON-LIMITING EMBODIMENT(S)

Reference will now be made in detail to various non-limiting embodiment(s) of a molding system and a related method for the operation thereof. It should be understood that other non-limiting embodiment(s), modifications and equivalents will be evident to one of ordinary skill in the art in view of the non-limiting embodiment(s) disclosed herein and that these variants should be considered to be within scope of the appended claims.

Furthermore, it will be recognized by one of ordinary skill in the art that certain structural and operational details of the non-limiting embodiment(s) discussed hereafter may be modified or omitted (i.e. non-essential) altogether. In other instances, well known methods, procedures, and components have not been described in detail.

Introduction

There exists ways and means to check parameters of a molded article after it exits a molding system (i.e. downstream of the molding system), however this is after the fact, and it is time consuming. There may be large numbers of defective molded articles produced before the molding process can be adjusted.

Disclosed is a molding system having an integrated vision system with which to appreciate selected parameter(s) of a molded article molded therein for controlling operation thereof.

The molding parameter may include, for example, one or more selected dimension(s) of the molded article or a temperature thereof. At present there is no means to measure the dimension of the molded article within the molding system (i.e. before it leaves the machine), and to use that information to adjust and control the process. The molding parameter may be inspected at various locations within the molding system, such as, for example in the mold or on a conveyor of a post-mold conditioning apparatus within the molding system.

Furthermore, the molding process may be controlled on the basis of the parameter of the molded article. For example, based on the dimension checking of the molded articles while they are on the conveyor, a controller of the molding system can verify if the molding process is tuned to manufacture defect free molded articles. If it is not, the necessary process parameters can be adjusted to ensure the manufacture of a defect free molded article.

By adjusting the necessary process parameters based on the feedback received from the vision system, the process may be effectively controlled to ensure a defect free molded article.

Non-Limiting Embodiments

Figure 1:
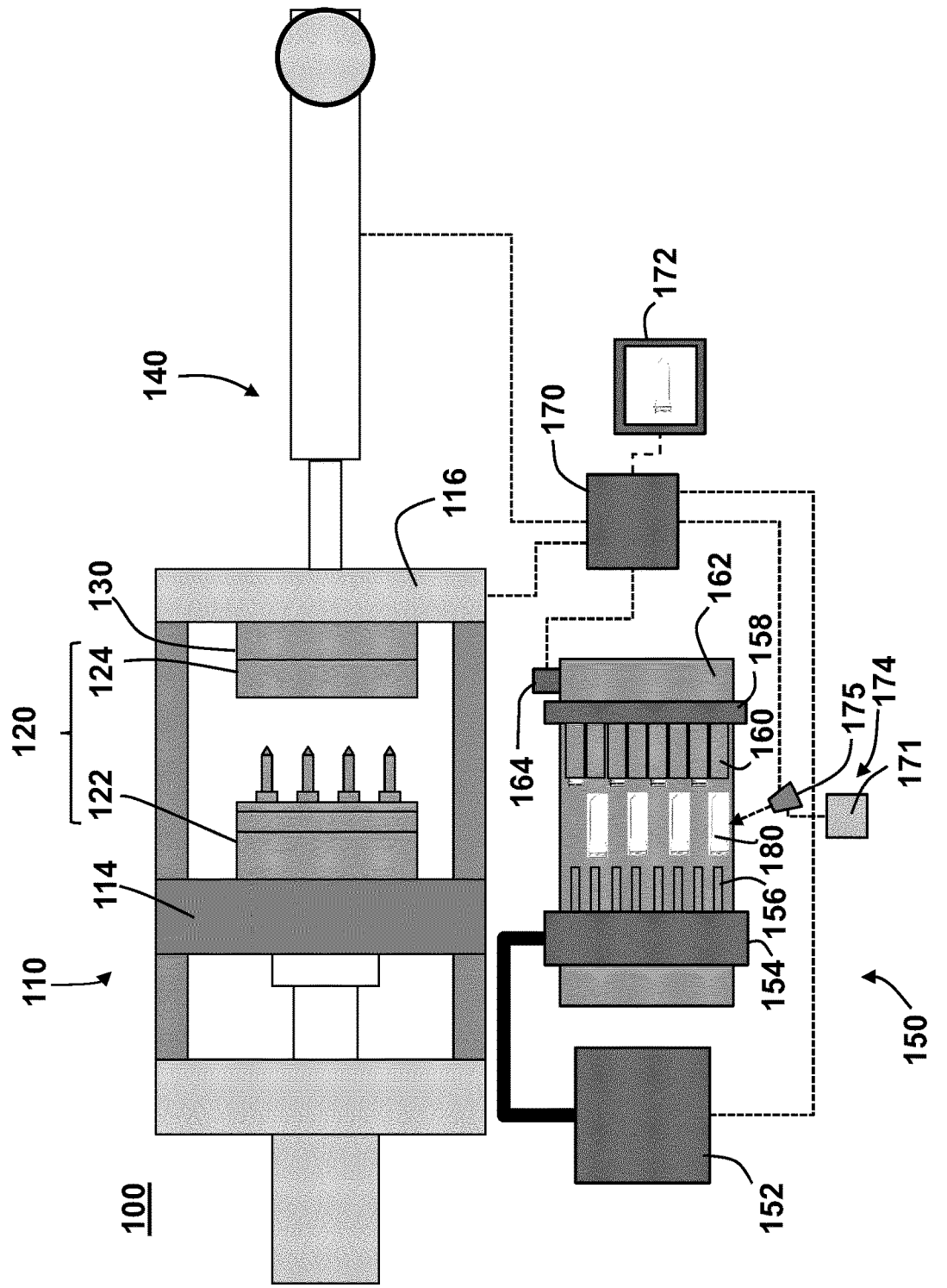
FIG. 1 depicts a schematic representation of a molding system according to a non-limiting embodiment.

With reference to FIG. 1 there is depicted a schematic representation of a molding system 100 in accordance with a non-limiting embodiment. The molding system broadly includes molding structure that is configured to mold a molded article 180, a controller 170 with which to control the operation of the molding structure, a post-mold conditioning apparatus 150 that is configured to thermally condition the molded article 180 after it has been removed from a mold 120, and a vision system 174 with which to appreciate a parameter of the molded article 180.

The molding structure includes a mold clamp 110 that is configured to open, close and clamp the mold 120, a melt preparation device 140 that is configured to prepare and inject molding material for molding in the mold 120, and a molding material distributor 130 that is configured to distribute the molding material to the mold 120.

The foregoing elements of the molding structure are well known to those of skill in the art and will not be discussed in detail herein. Suffice it to state that the mold 120 includes a first part 122 and a second part 124 that when closed together define a plurality of molding cavities within which molded articles, such as, for example, preforms of the type for blow molding into containers, are moldable. The first part 122 is mounted to a moving platen 114 of the mold clamp 110. The second part 124 is mounted to the molding material distributor 130 which in turn is mounted on a stationary platen 116 of the mold clamp 110. In operation, the first part 122 is reciprocated relative to the second part 124 for opening and closing the mold 120 through relative movement between the moving platen 114 and the stationary platen 116. The molding material preparation device 140 is configured to prepare (e.g. melt) molding material (not shown) and to inject the molding material through the melt distributor 130 and into the plurality of molding cavities of the mold 120.

The post-mold conditioning apparatus 150 includes a retrieval device 158 that is configured to retrieve the molded article 180 from the mold 120 and to thermally condition the molded article 180 in the process, an auxiliary device 154 that is configured to thermally condition the molded article 180 while it is in the retrieval device 158, an air conditioner 152 that is configured to supply, in use, thermally conditioned air to the auxiliary device 154 for thermally conditioning the molded article 180 and a conveyor 162 that is configured to receive the molded article 180 from the auxiliary device 154 for conveyance thereof outside of the molding system 100.

The foregoing elements of the post-mold conditioning apparatus 150 are well known to those of skill in the art and will not be discussed in detail herein. Suffice it to state that the retrieval device 158 includes a group of holders 160 within which to receive the molded articles 180 from the mold 120. In operation the molded articles 180 are cooled within the holders 160 as they are transported from the mold 120. The auxiliary device 154 includes a group of pins 156 from which treated air may be expelled for cooling interior regions of the molded articles 180 while they remain resident in the holders 160 of the retrieval device 158. As such, the auxiliary device 154 is connected to the air conditioner 152 that supplies air at a prescribed temperature and flow rate thereto. Once the molded articles are cool enough to be released they are ejected onto the conveyor 162 for transport away from the molding system 100. The molded articles 180 may continue to cool on the conveyor 162 for a time that it takes for transport from the molding system by virtue of air circulation in a region thereof.

Figure 2:
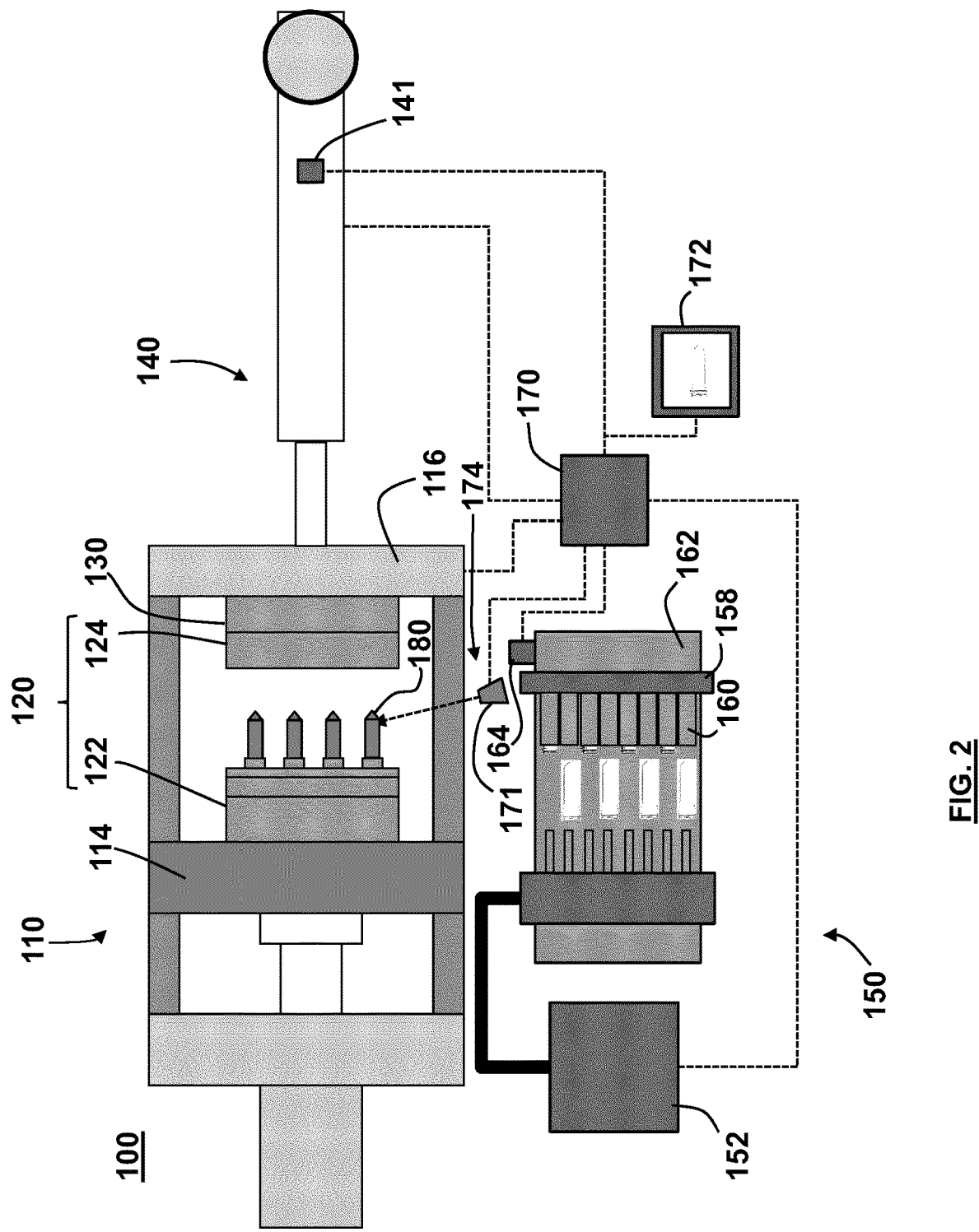
FIG. 2 depicts a schematic representation of a molding system according to a further non-limiting embodiment.

Vision systems are known devices and thus the structure and operation thereof will not be discussed herein. Suffice it to state that the vision system 174 includes one or more camera(s) 175 with which to appreciate a parameter of the molded article(s) 180 of interest. The vision system 174 may further include a controller 171 to execute steps to process information received from the camera. Alternatively, the control structure of the vision system 174 may be executed within the controller 170 of the molding system 100. Either way, the vision system 174 is ultimately connected to the controller 170 by any suitable means to communicate the parameter of the molded article 180 therewith. The camera(s) 175 of the vision system 174 may be positioned to inspect the molded article 180 in the mold (from the top, bottom, and/or side) or elsewhere in the post-mold conditioning apparatus 150. For example, and as shown, the vision system 174 may be positioned to inspect the molded articles 180 while they are on the conveyor 162. In a further example, as shown with reference to FIG. 2, the vision system 174 may be positioned to inspect the molded articles 180 while they are on the mold 120.

As previously mentioned, the controller 170 may be configured to control the molding structure with reference to the parameter of the molded article 180. In this non-limiting embodiment one or more of the mold clamp 110, the melt preparation device 140, the molding material distributor 130, the retrieval device 158, the auxiliary device 154, the air conditioner 152 and the conveyor 162 may be controlled on the basis of the parameter of the molded article 180.

For example, the controller 170 may be configured to control a speed of the conveyor 162 (through control of a drive 164 that is associated therewith) on the basis of the parameter (e.g. temperature) of the molded article 180 not being within a pre-determined bound. More particularly, the controller 170 may be configured to slow-down the conveyor 162 if the temperature is too high and speed-up the conveyor 162 if the temperature is too cool.

In another example, the controller 170 may configured to control an operating parameter of the air conditioner (e.g. flow rate, humidity, temperature) on the basis of the parameter (e.g. temperature) of the molded article 180. More particularly, the controller 170 may be configured to increase the flow rate of the air if the temperature is too high and decrease the flow rate of the air if the temperature is too cool.

In another example, the controller 170 may configured to control an operating parameter of the molding material distributor 130 on the basis of the parameter of the molded article 180.

Traditionally when the injection molding operation is completed and before the molded articles are ejected, there is no temperature sensing of the molded articles. As such, we can potentially use the vision system 174 to overcome these limitations. The machine vision system can measure a parameter such as, for example, the temperature of the molded articles before they are ejected and send the information to the controller 170.

Based on the feedback, the controller 170 may send commands to control the molding material distributor 130. For example, it may control valve gates (not shown) therein to adjust the melt balance. It may also send feedback to a hot runner controller (not shown) to adjust the temperature settings. The controller can also send commands to a cooling circuit within the mold 120 to adjust the mold cooling temperature.

By adjusting the necessary process parameters based on the feedback received from the vision system 174, the process can be effectively controlled to ensure substantially defect free molded articles.

In yet a further example, the vision system 174 may be configured to gauge a color of the molded articles being molded in contrast with a selected standard to determine if the color is within a predetermined specification. If there is a discrepancy, the controller 170 may control a colorant dispenser 141 (FIG. 2) accordingly.

In yet another example the vision system 174 may be configured to sense the presence or absence of the molded articles in the mold 120 and to control adjust or disable the molding system 100 accordingly (i.e. mold protection).

It is noted that the foregoing has outlined some of the more pertinent non-limiting embodiments. It will be clear to those skilled in the art that modifications to the disclosed non-embodiment(s) can be effected without departing from the spirit and scope thereof. As such, the described non-limiting embodiment(s) ought to be considered to be merely illustrative of some of the more prominent features and applications. Other beneficial results can be realized by applying the non-limiting embodiments in a different manner or modifying them in ways known to those familiar with the art. This includes the mixing and matching of features, elements and/or functions between various non-limiting embodiment(s) is expressly contemplated herein so that one of ordinary skill in the art would appreciate from this disclosure that features, elements and/or functions of one embodiment may be incorporated into another embodiment as skill in the art would appreciate from this disclosure that features, elements and/or functions of one embodiment may be incorporated into another embodiment as appropriate, unless described otherwise, above. Although the description is made for particular arrangements and methods, the intent and concept thereof may be suitable and applicable to other arrangements and applications.

What is claimed is:

1. A control structure for use with a molding system comprising:
   a vision system that is configured to appreciate a parameter of a molded article molded by the molding system for controlling operation thereof, the parameter comprising a temperature of the molded article,
   wherein the vision system includes one or more cameras that are configured to provide observations of the parameter of the molded article to one or both of a controller that is associated with the vision system and/or a controller that is associated with the molding system, wherein one or both of the controllers are configured to execute steps to process information received from the camera representative of the parameter of the molded article to control operation of the molding system;
   wherein the molding system includes a post-mold conditioning apparatus that includes:
      a retrieval device that is configured to retrieve the molded article from a mold and to thermally condition the molded article in the process;
      an auxiliary device that is configured to thermally condition the molded article while it is in the retrieval device; and
      an air conditioner that is configured to supply, in use, thermally conditioned air to the auxiliary device for thermally conditioning the molded article; and
   wherein the one or more cameras of the vision system are positioned to inspect the molded article while it is in the mold; and
   wherein the controller is configured to control an operating parameter of the air conditioner of the post-mold conditioning apparatus on the basis of the temperature of the molded article as measured before the molded article is ejected from the mold.

2. The control structure of claim 1, wherein the parameter of the molded article observed by the one or more cameras of the vision system comprises a color of the molded article;
   wherein the molding system further includes a molding material colorant dispenser; and
   wherein the controller is configured to control the colorant dispenser on a basis of the observed color of the molded article.

3. The control structure of claim 1, wherein:
   the post-mold conditioning apparatus includes a conveyor that is configured to receive the molded article from the auxiliary device for conveyance thereof outside of the molding system; and
   the vision system is configured to inspect the molded article while it is on the conveyor of the post-mold conditioning apparatus.

4. The control structure of claim 1, wherein the post-mold conditioning apparatus includes a conveyor that is configured to receive the molded article from the auxiliary device for conveyance thereof outside of the molding system; and
   wherein the controller is configured to control a speed of the conveyor on the basis of the temperature of the molded article.

5. The control structure of claim 4, wherein:
   the controller is configured to slow-down the conveyor if the temperature is above a pre-determined bound and speed-up the conveyor if the temperature is below the pre-determined bound.

6. The control structure of claim 1, wherein:
   the operating parameter of the air conditioner is a flow rate of air.

7. The control structure of claim 6, wherein:
   the controller is configured to increase the flow rate of air if the temperature is above a pre-determined bound and decrease the flow rate of air if the temperature is below the pre-determined bound.

8. The control structure of claim 1 wherein the parameter of the molded article includes the presence or absence of the molded article in the mold and wherein the controlling of the operation of the molding system comprises disabling the molding system based on the presence or absence of the molded article in the mold.

9. A method of controlling operation of a molding system, comprising:
   executing steps in a controller to process information received from a camera of a vision system representative of a parameter of a molded article molded in the molding system measured by inspecting the molded article while it is in a mold of the molding system within which the molded article is molded before being received by a post-mold conditioning apparatus of the molding system within which the molded article is thermally conditioned after removal from the mold, the post-mold conditioning apparatus including:
      a retrieval device that is configured to retrieve the molded article from the mold and to thermally condition the molded article in the process;
      an auxiliary device that is configured to thermally condition the molded article while it is in the retrieval device; and
      an air conditioner that is configured to supply, in use, thermally conditioned air to the auxiliary device for thermally conditioning the molded article,
   the parameter including a temperature of the molded article as measured before the molded article is ejected from the mold; and
   controlling the molding system with reference to the parameter of the molded article, wherein the controlling of the molding system includes controlling an operating parameter of the air conditioner of the post-mold conditioning apparatus on a basis of the temperature of the molded article as measured before the molded article is ejected from the mold.

10. The method of claim 9, wherein the parameter of the molded article appreciated by the vision system comprises a color thereof;
    wherein the molding system includes a molding material colorant dispenser for controlling a color of the molding material being molded; and
    wherein the controlling the molding system with reference to the parameter of the molded article includes controlling the colorant dispenser on the basis of the color of the molded article.

11. The method of claim 10, wherein:
    the post-mold conditioning apparatus includes a conveyor that is configured to receive the molded article from the auxiliary device for conveyance thereof outside of the molding system;
    the vision system is configured to inspect the molded article while it is on the conveyor;
    and wherein the controlling the molding system with reference to the parameter of the molded article includes controlling a speed of the conveyor with reference to the temperature of the molded article.

12. The method of claim 11, wherein:
    the controlling the speed of the conveyor with reference to the temperature of the molded article includes:

determining if the temperature of the molded article is within a pre-determined bound; and slowing-down the conveyor if the temperature is above the pre-determined bound and speeding-up the conveyor if the temperature is below the pre-determined bound.

13. The method of claim 9, wherein:

the operating parameter of the air conditioner is a flow rate of the air and the controlling the air conditioner with reference to the temperature of the molded article includes:

determining if the temperature of the molded article is within a pre-determined bound; and increasing the flow rate if the temperature is above the pre-determined bound and decreasing the flow rate if the temperature is below the pre-determined bound.

14. The method of claim 9 wherein the parameter of the molded article includes the presence or absence of the molded article in the mold and wherein the controlling of the operation of the molding system comprises disabling the molding system based on the presence or absence of the molded article in the mold.

\* \* \* \* \*